June 8, 1943.  C. J. WINDFELDT  2,321,443
TEST INDICATOR
Filed Sept. 28, 1940
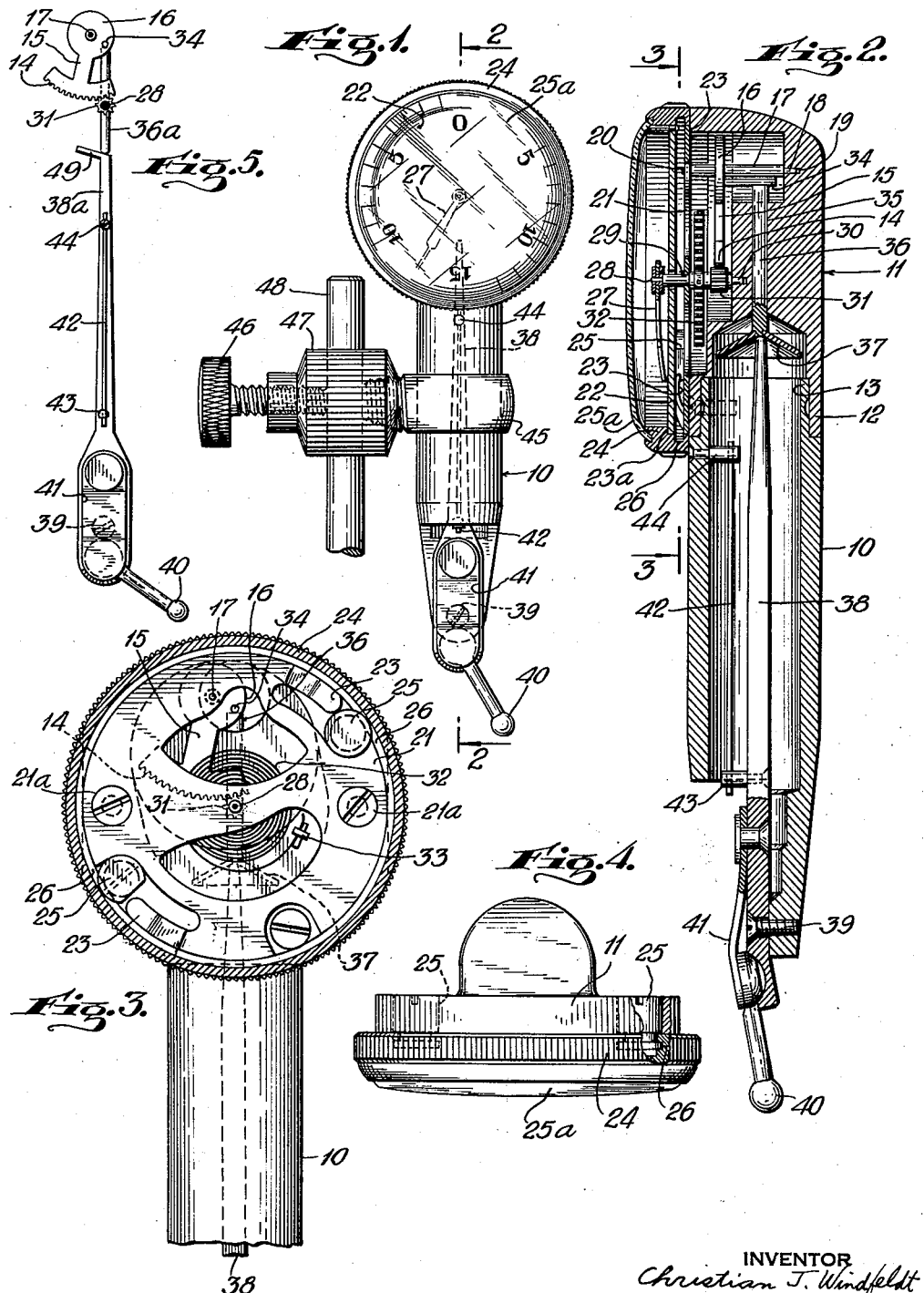
INVENTOR
Christian J. Windfeldt
BY
A. H. Golden
ATTORNEY Patented June 8, 1943

2,321,443

UNITED STATES PATENT OFFICE 2,321,443

TEST INDICATOR

Christian J. Windfeldt, Stamford, Conn.

Application September 28, 1940, Serial No. 358,899

5 Claims. (Cl. 33—172)

This invention relates to indicating instruments, and more particularly to test indicators of the type disclosed in the Lowe Patents Nos. 1,144,367, issued July 29, 1915, and 1,466,664, issued September 4, 1923.

More particularly, my invention relates to that type of indicating instrument in which the indicating dial may be readily rotated relatively to the main body of the indicator so that the reading of the indicator may be seen from any one of several rotated positions. As one feature of my invention, the measuring lever of my indicating instrument is pivotally mounted, and may actuate the indicator as it rotates in either of opposite directions on its pivotal mounting, and in any rotated position of the indicating dial.

A further feature of my invention is the utilization of a dial and indicating mechanism mounted on what I term a dial body which is rotatable relatively to the main body of the indicator, with the means of connection between a measuring lever mounted on the main body of the indicator and the said indicating mechanism comprising means overlying the axis of rotation of said dial body and a cam actuated by the measuring lever.

A still further feature of my invention is the utilization of a dial body carrying a dial and indicating mechanism and rotatable relatively to the main body of the indicator on which a measuring lever is pivotally mounted, with the feature that the measuring lever operates through a cam mechanism, means positioned in the axis of rotation of the dial body, those means in turn effecting the movement of the indicating mechanism.

Other features of the invention which I shall not herein set forth in greater detail, but which are described more fully in the specification which follows, include the construction of the indicating mechanism and its operating means.

I have thus described generally my invention, before presenting a detailed description thereof, in order that the nature and scope of my contribution to the art may be better understood. While I shall now show and describe a preferred form in which my contribution may be embodied, it should be understood that my invention may be utilized in various other forms, and that the patent monopoly to be granted me should be sufficiently broad to prevent the appropriation of my invention in such other forms as may be conceived by those skilled in the art.

Referring now more particularly to the drawing, Fig. 1 is an elevation of the test indicator of my invention showing the means whereby it is readily secured to a machine or other tool. Fig. 2 is a section taken along lines 2—2 of Fig. 1, while Fig. 3 is a section along lines 3—3 of Fig. 2. Fig. 4 is a view looking downwardly on the dial body with parts of said body cut away. Fig. 5 is a diagrammatic view of certain parts forming a modification of my invention.

Referring even more particularly to the drawing, the main body of my indicator is preferably in the form of a tube and is designated by the reference numeral 10. Rotatable relatively to this tube is what I term the dial body 11, which has a portion 12 inserted over the reduced upper end 13 of the tube 10. It will be readily seen that through this relationship of the parts, the dial body 11 is freely rotatable on the tube 10, suitable means being provided to prevent accidental removal of the dial body 11 endwise from the tube 10, as will be understood by those skilled in the art.

A gear sector 14 is formed integrally with an arm 15 which extends from what I term an indicator disk 16, best shown in Fig. 3. The disk 16 is secured as by staking to a pivot shaft 17 for rotation with that shaft. As best shown in Fig. 2, the pivot shaft 17 has a reduced end 18 mounted in a bearing bore 19 in the dial body 11. The other end of the pivot shaft 17 is mounted as at 20 in a disk 21 which is secured to the flat forward surface 23 of the dial body 11 by screws 21a (Fig. 3). Suitable spring-like projections 23 on the disk 21 press against a dial 22 and maintain it in proper relationship against the shouldered portion 23a of a bezel 24.

The bezel 24, which holds the glass 25a, is secured relatively to the dial body 11, as shown in Figs. 3 and 4, through the utilization of studs 25 extending from the dial body, portions of which studs enter grooves 26 in the bezel 24 in one rotated position of the studs. When the studs 25 are in the position of Fig. 3, the bezel is retained against removal from the dial body 11, but is freely rotatable thereon, and carries the dial therewith. In this manner, the dial 22 may be readily calibrated, as will be appreciated.

The indicating hand is designated by reference numeral 27, and is secured to the indicating shaft 28, which in turn is mounted at 29 in the disk 21, and at 30 in the dial body 11. A pinion 31 is formed on this indicating shaft 28, and is in engagement with the teeth of the gear sector 14. A hair spring 32 is secured at one end to the indicating shaft 28 and at its other end to a lug 33 extending from the dial body 11, it being the function of the hair spring to resist rotation of the indicating shaft and its hand, and thereby resisting also the rotation of the gear sector 14 and the indicator disk 16.

The indicator disk 16 has formed thereon a pin 34 which lies directly over the axis of rotation of the dial body 11 relatively to the tube portion 10 of the indicator, as is best seen from Figs. 1 and 3. As a result, in any rotated position of the dial body, the pin 34 will lie in the same relation to the axis of rotation of the dial body 11 as it does in Figs. 2 and 3. The dial body 11 has a bore 35 formed therein in the axis of rotation of the said dial body relatively to the tube portion 10, and slidably mounted in this bore is a vertically moving operating pin 36 having a cup shaped cam member 37 formed integrally therewith at its lower end. This cup shaped cam member lies directly over the upper end of a measuring lever 38 which extends upwardly in the tube portion 10. This measuring lever 38 is of a type well known in this art, and is mounted and actuated as are the measuring levers of instruments of this class. As here shown, lever 38 is pivoted at 39 to the tube 10 for indicating motion to be imparted thereto by its contact portion 40 secured thereto through the intermediary of a spring clip 41, in a manner which is well known in this art. A spring 42 may be utilized, extending between a pin 43 on the measuring arm 38 and a pin 44 on the tube portion 10 of the indicator, to maintain the measuring lever 38 in a neutral or initial zero position. The measuring lever is pivotally rotatable in either of opposite directions relatively to its pivotal mounting at 39, as will be readily perceived.

It will now be readily appreciated that regardless of the position to which the dial body 11 is rotated on tube 10, the pin 34 on the indicator disk 16 will always lie over the operating pin 36 and in the axis of rotation of the dial body 11 relatively to the tube portion 10 of the indicator. Therefore, the pin 34 will always be in a position to be actuated by the upward movement of the pin 36, which movement will be imparted to the pin 36 by the measuring lever 38 in proportion to the movement of the lever 38, since as the lever 38 rotates on its pivot 39, in either of its opposite directions, its contact with the cam surface of the cup 37 will force the operating pin 36 upwardly in proportion to the pivotal movement of the measuring lever 38. It is thus seen that regardless of the rotated position of the dial body 11, the indicator disk 16 will be actuated and will through the connections already described, operate the indicating hand 27 in direct proportion to the pivotal movement of the measuring lever 38.

Before describing the modification of Fig. 5, it may be well to indicate that a suitable bracket 45 may be secured about the tube portion 10 of the indicator whereby through an adjusting screw 46 operating within a threaded member 47, the instrument may be readily secured to a rod 48 of a machine, if desired. This is merely the usual securing means well known in the art.

In Fig. 5, I illustrate a modified form of my invention in which the measuring lever 38 has substituted therefor a measuring lever 38a equipped with a cam surface 49. This cam surface 49 cooperates with an operating pin 36a, substituted for the operating pin 36 in the first modification. It is obvious that if the operating pin 36a is mounted in the axis of rotation of the dial body 11, as is mounted the operating pin 36, the cam surface 49 of the measuring lever 38a will operate the pin 36a in all rotated positions of the dial body. The operating pin 36a will therefore operate the pin 34 of the indicator disk 16, whereby to actuate the gear sector 14 on the said disk, which in turn through the pinion 31 will operate the indicating shaft 30 and the hand 27 mounted thereon, all as will be now fully appreciated.

I now claim:

1. In an indicator of the class described, a main body substantially in the form of a tube, a measuring lever pivoted near the outer end of said tube with one end of said lever extending through said tube for movement in opposite directions from a central zero position, a spring biasing said measuring lever into said central zero position and resisting its movement in either of said opposite directions, a dial body mounted for rotation on the inner end of said tube, indicating mechanism in said dial body including an operating part lying over the axis of rotation of said dial body relatively to said tube in all rotated positions of said dial body, a pin slidable endwise in a bore formed in said dial body in the said axis of rotation of said dial body, and with the upper end of said pin in contact with said operating part while the lower end of said pin extends toward the inner end of said tube, a cam formed on the lower end of said pin and maintained engaged with said measuring lever whereby said pin has imparted thereto sliding movement by said measuring lever as said measuring lever pivots on said tube, and a second spring for pressing said cam against said measuring lever in all positions of said measuring lever.

2. In an indicator of the class described, a main body substantially in the form of a tube, a measuring lever pivoted near the outer end of said tube with one end of said lever extending through said tube and adapted for movement in opposite directions from a central zero position, a spring biasing said measuring lever into said central zero position and resisting its movement in either of said opposite directions, a dial body mounted for rotation on the inner end of said tube, indicating mechanism in said dial body including an operating part lying over the axis of rotation of said dial body relatively to said tube in all rotated positions of said dial body, a pin slidable endwise in a bore in said dial body formed in the axis of rotation of said dial body, and with the upper end of said pin in contact with said operating part while the lower end of said pin extends toward the said tube, a cam formed on the inner end of the measuring lever and engaging the lower end of said pin whereby said pin has imparted thereto sliding movement by said measuring lever as said measuring lever pivots on said tube, and a second spring for pressing said pin against said measuring lever in all positions of said measuring lever.

3. In an indicator of the class described, a main body portion, a measuring lever pivotally mounted relatively to said main body portion and movable on its pivotal mounting in opposite directions, a spring biasing said lever into a central position, a dial body rotatable on said main body portion, an indicator in said dial body rotatable therewith relatively to said main body, operating means for operating said indicator in all rotated positions of said dial body relatively to said main body, a cam connection between said operating means and said measuring lever whereby said operating means are movable a predetermined degree by said measuring lever as said measuring lever rotates in either of said opposite directions, and a second spring for pressing said operating means against said measuring lever in all positions of said measuring lever.

4. In an indicator of the class described, a main body portion, a measuring lever pivotally mounted relatively to said main body portion and movable on its pivotal mounting in opposite directions, a spring biasing said lever into a central position, a dial body rotatable on said main body portion, an indicator in said dial body, an operator slidable in the axis of rotation of said dial body relatively to said main body, means whereby said operator moves said indicator as it slides in said axis of rotation, a cam connection between said measuring lever and said operator whereby said measuring lever imparts sliding movement to said operator in one direction only as said measuring lever rotates in either of said opposite directions, and a second spring pressing said operator against said measuring lever in all positions of said measuring lever.

5. In an indicator of the class described, a main body portion, a measuring lever pivotally mounted relatively to said main body portion and movable on its pivotal mounting in opposite directions, a dial body rotatable on said main body portion, an indicator in said dial body rotatable therewith relatively to said main body, an operator slidable in the axis of rotation of said dial body relatively to said main body, means whereby said operator moves said indicator as it slides in said axis of rotation, a cam connection between said measuring lever and said operator whereby said measuring lever imparts sliding movement to said operator in one direction only as said measuring lever rotates in either of said opposite directions, a spring for maintaining said operator pressed against said measuring lever whereby said operator follows the movement of said measuring lever, and a further spring for pressing said measuring lever yieldingly into a central zero position in which the operator and its spring maintain the indicator in a zero position.

CHRISTIAN J. WINDFELDT.